United States Patent [19]

Nelson

[11] Patent Number: 5,779,010
[45] Date of Patent: Jul. 14, 1998

[54] SUSPENDED LOW-FREQUENCY HORIZONTAL PENDULUM ISOLATOR FOR VIBRATION ISOLATION SYSTEMS

[75] Inventor: Peter G. Nelson, Newburyport, Mass.

[73] Assignee: Technical Manufacturing Corporation, Peabody, Mass.

[21] Appl. No.: 682,855

[22] Filed: Jul. 12, 1996

[51] Int. Cl.⁶ .................................................. F16F 7/10
[52] U.S. Cl. ..................................... 188/378; 267/136
[58] Field of Search ............................... 188/378, 379, 188/382; 267/136, 195

[56] References Cited

U.S. PATENT DOCUMENTS

| | | | |
|---|---|---|---|
| 3,382,629 | 5/1968 | Reutlinger | 188/378 X |
| 4,609,083 | 9/1986 | Stuhler | 188/378 |

FOREIGN PATENT DOCUMENTS

| | | | |
|---|---|---|---|
| 97342 | 6/1984 | Japan | 188/378 |
| 386180 | 9/1973 | U.S.S.R. | 188/378 |

*Primary Examiner*—Peter M. Poon
*Attorney, Agent, or Firm*—Samuels, Gauthier, Stevens & Reppert

[57] ABSTRACT

A horizontal frequency vibration pendulum isolator which comprises a pendulum which has an upper end flexibly secured to a vertical isolator. The pendulum is received within a hollow leg and is supported at its lower end by pendulum wires which wires are secured to the hollow leg which is grounded. The wires are specifically angled with reference to the longitudinal axis of the pendulum to impart to the horizontal isolator a known or designed horizontal stiffness.

15 Claims, 2 Drawing Sheets

SUSPENDED LOW-FREQUENCY HORIZONTAL PENDULUM ISOLATOR FOR VIBRATION ISOLATION SYSTEMS

FIELD OF THE INVENTION

BACKGROUND AND SUMMARY OF THE INVENTION

There are two basic geometries for integrating pendulums with pneumatic "air spring" isolators. In the first, vibration is transmitted from the earth, through the pendulum, then through a vertical air spring to the payload (pendulum first). In the second, vibration is transmitted through the air spring, then the pendulum (spring first). Spring first systems have the advantage that the isolator (with all of its heavy components) is resting on the earth. A light-weight top plate on the isolator forms a pendulum wire assembly, which holds the payload. Its advantage is a minimal intermediate mass resonance.

Intermediate mass resonance occurs because the pendulum assembly is attached to the ground through the pendulum wires, and to the payload through a rolling rubber diaphragm of the pneumatic isolator, thus it is free to move (i.e.; it is not rigidly connected to anything). This 'sprung mass' can therefore resonate on the stiffness of the diaphragm/pendulum wire combination.

The disadvantage of spring-first systems is two fold. The effective support point for a spring-first isolator is the bottom of the pendulum wires. The height of the payload's center-of-mass (cm) above the effective support point is a critical dimension for the stability of the system: The higher the ratio of the cm height to the isolators' separation (platforms must be supported by three or more isolators) the less stable the system. Thus, a spring first system can become unstable for high-cm payloads which would be stable on non-pendulum isolators. The second disadvantage is also related to instability. Instability occurs when the horizontal position of the payload cm moves relative to the vertical pneumatic isolators. Such motion can be caused either by a tilt, or an actual horizontal translation. In either case, the result is that the burden of supporting the payload is shifted from one isolator to another. This causes the isolators more heavily burdened to depress, and those with a lightened load to extend. The result is a payload tilt and valves must then correct the leg pressures to compensate. If the tilting is too severe the system can go into oscillation. In spring first systems, either horizontal motion or tilt produce tilt, and add to tilt stability problems.

In pendulum first systems, because the vertical isolators are fixed to the payload, horizontal motions do not change the relative air springs' burden, and thus do not generate tilt. This phenomenon is called 'horizontal to tilt coupling' in the art, and its elimination is the great advantage of pendulum first systems. The other advantage of pendulum first systems is that the effective support point is at the top of the pendulum wires. This decreases the ratio of the cm height to the isolator separation and gives systems a greater margin of tilt stability.

It is believed all prior embodiments of this type of isolator, however, have involved the entire vertical isolator (with its air tank and other massive components) being supported by the pendulum, thus giving rise to large, low frequency 'sprung mass' resonances.

The present invention has the best of both types: it has a high support point and eliminates horizontal to tilt coupling caused by shifting payload burdens while maintaining a small intermediate mass normally associated with spring first designs.

The present invention suspends a tube (pendulum) isolator on adjustably angled pendulum wires. The ability to angle the pendulum wires (and adjust that angle) allows an arbitrarily low horizontal resonance frequency to be obtained. The pendulum isolator is fully integrated with a vertical pneumatic isolator, providing an effective multi-axis vibration support system. The horizontal stiffness of the isolator can be adjusted to 0.5 Hz or even lower. Unlike prior art suspended isolators, the pendulum isolator uses an extremely light weight pendulum assembly—greatly reducing the intermediate sprung-mass resonance associated with other prior art designs. This is primarily achieved by locating the air chamber at the top of the pendulum and not suspending it on the pendulum. This resonance shows up as a peak in the vibration transfer function. The light mass of the present invention's pendulum, basically a tube, moves this resonance 2–4 times higher in frequency, and greatly reduces its amplitude, when compared to prior art suspended isolators. Typically, the tube weighs less than a tenth of prior art 'pendulums'.

The pendulum portion of the present invention is similar to a simple pendulum in that the frequency is a matter of geometry. The resonant frequency is independent of the payload, just as the period of a pendulum is only a function of the pendulum's length (and not its mass).

Broadly the invention comprises a horizontal frequency vibration pendulum isolator. The pendulum wires are angled with reference to longitudinal axis of the pendulum to impart to the isolator a known or designed horizontal stiffness. The pendulum wires may be fixed or adjustable. In the preferred embodiment the lower ends of the pendulum wires are adjustable in their radial positions to facilitate flexibility in varying the horizontal stiffness of the isolator. The pendulum isolator is supported by and within a square hollow leg. A pendulum tube is suspended within the leg and secured at its lower end by pendulum wires. The top of the wires are secured to a section of the isolator which is secured to the leg which is grounded. The upper end of the pendulum is in communication with an air chamber of a verticle pneumatic isolator which supports a payload. The upper end of the pendulum is secured to the air chamber via a rolling diaphragm. The lower end of the pendulum is characterized by an array of apertures lying in a plane perpendicular to the longitudinal axis of the pendulum. The lower ends of the pendulum wires can be secured in any of several locations varying the pendulum wire angles and therefore adjusting the horizontal resonant frequency. That is the pendulum wires are adjustable in their radial position. This can be done either by having radial slots in the pendulum's bottom plate, or a series of radial holes.

The pendulum motion of the pendulum wires causes the height of the payload to increase—causing a restoring force (the spring constant for the system can be directly derived from the ratio of the change in the payload's center-of-mass (cm) height to the square of its horizontal displacement). The angle of the pendulum wires cause the pendulum tube to tilt with the pendulum's horizontal displacement. A tilt in the pendulum tube has the effect of lowering the payload center of mass, partially canceling the increase in the center of mass height caused by the pendulum component of the motion. This lowers the horizontal frequency of the system below that for a system which uses straight wires. By adjusting the pendulum wire angles, the cancellation can be made more precise, further lowering the resonant frequency.

3

Figure 1:
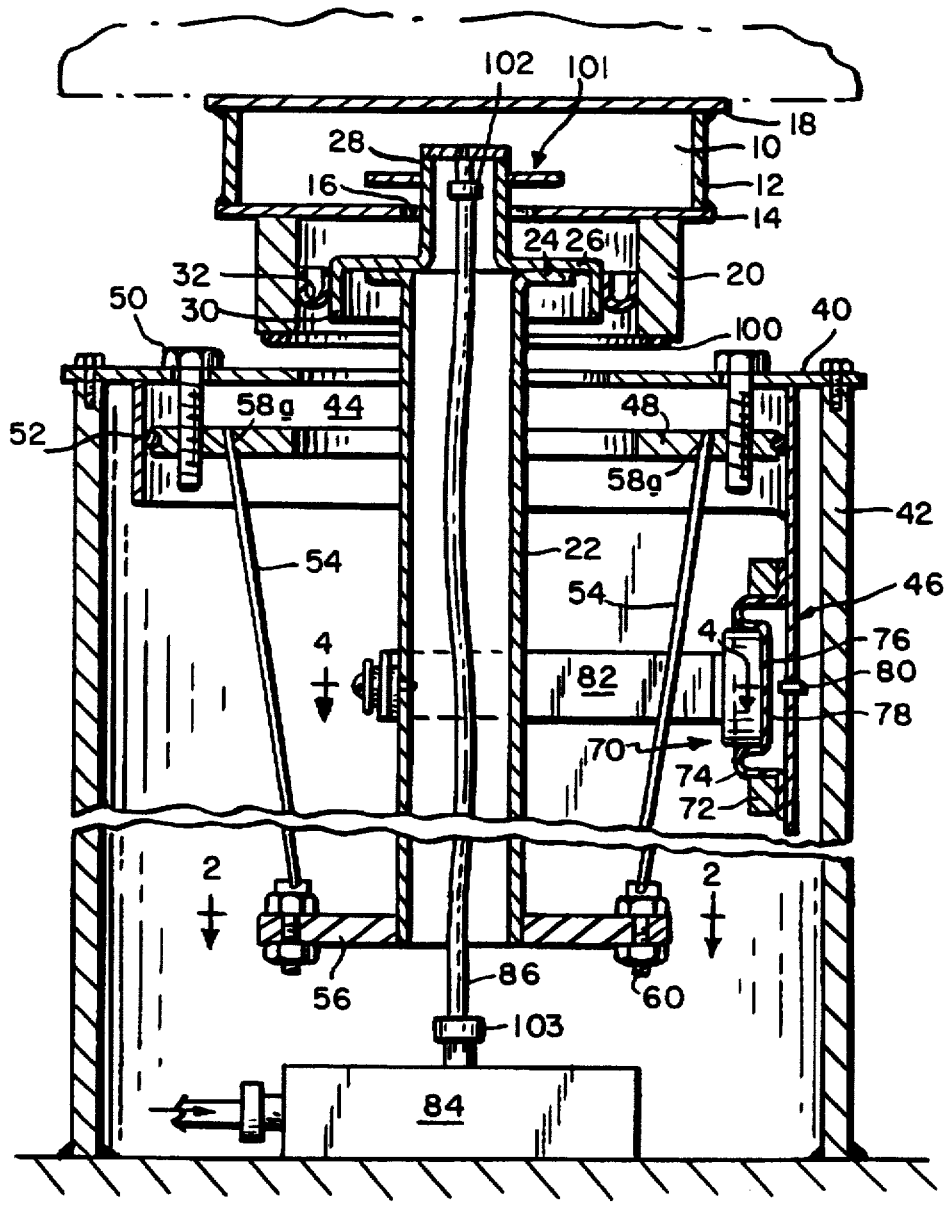
FIG. 1 is a front sectional view of an isolator embodying the invention.
Figure 2:
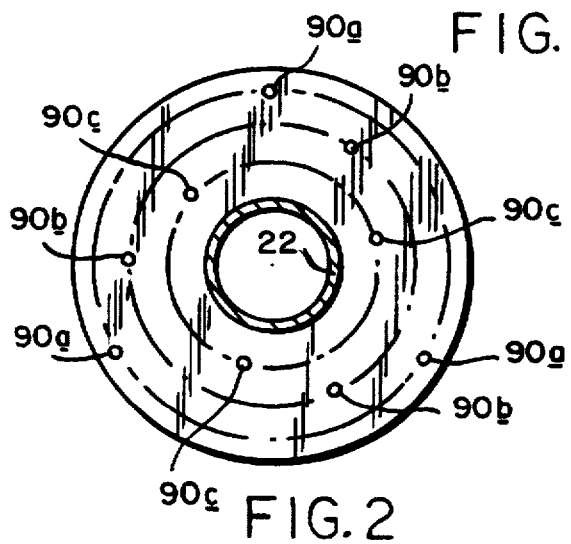
Figure 3:
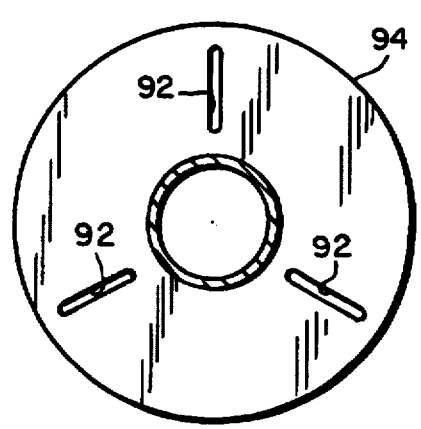
Figure 4:
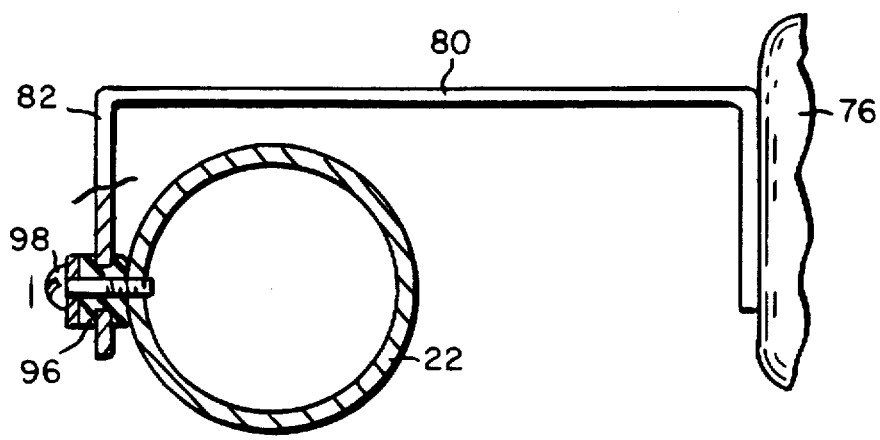

FIG. 2 is a bottom view of FIG. 1 taken along lines 2—2 of FIG. 1;

FIG. 3 is a bottom view of an annular angle adjust plate of an alternative embodiment of the invention;

FIG. 4 is a sectional view of FIG. 1 taken along lines 4—4 of FIG. 1; and

Figure 5:
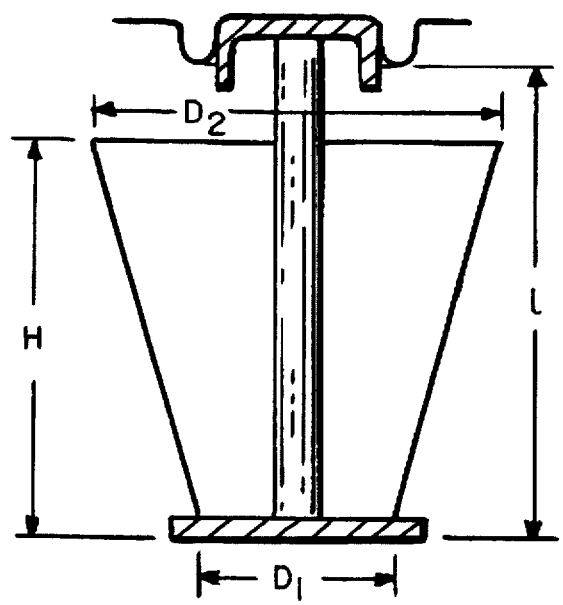

FIG. 5 is an illustration of the pendulum parameters.

DESCRIPTION OF THE PREFERRED EMBODIMENT(S)

With a system of the invention, resonant frequencies obtained with a 12" pendulum are equivalent to resonant frequencies obtained with 40" simple pendulums. The pendulum can be very light weight because it does not serve the function of a pressure chamber. This allows the pendulum to be made out of thin wall metal tube (0.042"). Other heavy components (such as the piston ring which the diaphragm rolls against) have been moved to the payload rather than the pendulum assembly, further reducing the pendulum mass. The light-weight pendulum design dramatically reduces the 'intermediate mass' resonance common to prior pendulum designs. The total 'sprung-mass' is only a few pounds and the associated resonance is above 20 Hz in most applications.

The pendulum wire angles are adjustable and thus the horizontal stiffness of the isolator can be adjusted from 1 Hz down to 0.5 Hz or below.

An isolator embodying the invention is shown in FIG. 1 and comprises an air chamber 10 having a depending cylindrical wall 12 and a bottom plate 14 having a central aperture 16. The chamber 10 has a top plate 18 which supports a payload. Secured to and depending from the bottom plate 14 is a piston ring 20. On the bottom of the ring 20 is a rubber pad 100 which comes to rest on a rectangular support plate 40 when the system is deflated, allowing for a soft landing and preventing damage to the support plate 40 when the system is down.

A tubular pendulum 22 has an upper end 24. A piston 26 is secured to the upper end 24 and has a tube 28 which extends through the aperture 16 into the chamber 10. Fastened to the tube 28 is a stop key 101 which cannot pass through the aperture 16. This forms a mechanical travel (safety) limit preventing overtravel of the piston 26. The piston 26 also includes a piston wall 30.

A rolling diaphragm 32 is joined to the piston ring 20 and to the piston wall 30. The diaphragm 32 seals the chamber 10 and allows relative motion between the chamber 10 and the pendulum 22. The diaphragm 32 also serves the critical role of providing a multi-axis pivot point at the top of the pendulum.

The rectangular support plate 40 is received on and is secured to a leg 42 which leg rests on ground.

Three depending walls, only one 44 shown, are formed on the underside of the support plate 40. A fourth wall or base plate 46 depends downwardly from the support plate 40 to support a dashpot 70.

An annular wobble plate 48 is joined to the support plate 40 by bolts 50. A damping compound 52 is interposed between the wobble plate 48, the three depending walls 44 and the base plate 46.

At the lower end of the pendulum 22 is an annular angle adjust plate 56, shown in greater detail in FIG. 2.

Three pendulum wires 54 (only two shown) are equally spaced radially 120° apart and are permanently secured at one end to three holes 58a (only two shown) in the wobble

4 plate 48. The bolts 50 (only two shown) adjust the tilt of the wobble plate 48 relative to the support plate 40. This levels the isolator and can be used to adjust the horizontal seat or null position of the isolator while the payload is floating. The wires 54 are equally spaced radially 120° apart and are secured at their other ends to the adjust plate 56 by threaded fasteners 60.

Referring to FIG. 2, the adjust plate 56 is shown in greater detail. Three sets of holes 90a, 90b and 90c are arranged as shown to lie in concentric circles. To vary the angle of the cables and thereby the ratio of tilt to horizontal motion of the pendulum the ends of the pendulum wires 54 are secured to the desired circle. When the wires are engaged in the three apertures (e.g. 90a in the adjust plate 56) they are in angular registration with the three holes 58a in the wobble plate 48. If the wires 54 are to be secured to the holes 90c in the adjust plate 56, the adjust plate is rotated to bring the holes 90c into register with the holes 58a and the wires are secured.

Referring to FIG. 3, radial slots 92 are formed in an adjustment plate 94. In this embodiment the number of achievable cable angles is infinite.

Referring to FIGS. 1 and 4, a dashpot shown generally at 70 comprises a piston ring 72 secured to the base plate 46. A piston 76 cooperates with the ring 72 via a flexible diaphragm 74, to define an air chamber 78. The air chamber 78 has a damping orifice 80 formed therein. The orifice 80 extends through the base plate 46. A flexible grommet 96 is received in an arm 82 and engages the tubular pendulum 22. A fastener 98 flexibly secures the arm to the tube via the grommet. The arm 82 is also secured to the piston 76.

An air supply chamber 84 communicates with the chamber 10 via a flexible tube 86, connected to the pressure fittings 102 and 103, which introduces air into the chamber 10. A small diameter orifice can be inserted into the tube 86 to provide damping for verticle motion of the payload, as is known in the art.

The design of the preferred embodiment allows the cable level to be adjusted via bolts 50 while the payload is floating, greatly reducing set-up time. The present invention also unloads the pendulum when the air pressure in the isolator is vented by having the piston ring 20 rest on the support plate 40 cushioned by the pad 100. This makes the system rigidly fixed to the ground when the system is 'off', making work on payloads easier, and improving the durability of the system when it is shipped as part of an integrated system.

Referring to FIG. 5, the equations describing the stability and frequency of the pendulum system are set forth below. The parameter H is the vertical distance (height) of the pendulum wires. The distance l is the height from the bottom of the wires to the pivot point below the payload (which is the top of the diaphragm roll in the preferred embodiment). $D_1$ and $D_2$ are the diameters of the circles to which the wires attach at the adjust plate 56 and wobble plate 48 respectively. g is gravitational acceleration (90.8 m/s$^2$). Assuming that the cables are flexible (add a negligible stiffness to the pendulum system) and that the lateral damper provides pure damping (without any restoring force), then the criterion for stability of the system (to a first-order approximation) is:

$$\left(1 - \frac{D_2}{D_1}\right)^2 < \left(\frac{H}{l}\right)$$

Likewise, the approximate frequency for the system is given (with the same qualifiers mentioned above) by:

$$V = \frac{1}{2\pi} \left\{ \frac{g(D_1^2 H - (D_2 - D_1)^2 l)}{D_1^2 H^2 + 2 D_1 H (D_2 - D_1) l + (D_2 - D_1)^2 l^2} \right\}^{\frac{1}{2}}$$

The invention will be described with reference to the following non-limiting example. The verticle isolator air chamber 10 is designed for a 250 to 2500 pound payload. The orifice 80 is a #70 hole. The pendulum wires are 12" long (H). The pendulum assembly has a weight of 2 lb and is suspended as shown in FIGS. 1 and 2. The length l is 13.5" and the diameters D1 and D2 are 2.81" and 5.0" respectively with the wires fastened to holes 58a and 90a. This arrangement results in a horizontal frequency of approximately 0.5 Hz. If the wires are secured in the holes 90c (having a D1=2.65") the horizontal frequency would be approximately 0.3 Hz.

In alternative embodiments of the invention, the pendulum could also function as a light-weight air tank. Cable length adjustments (needed to level the platform once the system is floating) can be moved to the bottoms of the pendulums.

The lateral damping (dashpot) can also be achieved using different techniques known in the art.

The cable angle adjustments can also be done by fixing the bottoms of the pendulum wires and changing the radial separation of the pendulum top wires in the wobble plate or radial adjustments can be made in both the angle adjust plate and the wobble plate.

The pendulum need not be secured directly to a diaphragm, which diaphragm is associated with a vertical air chamber. A gimbal arrangement other than a rolling diaphragm can be used such as hard ball and thrust plate.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A horizontal frequency vibration isolator which comprises:

an air chamber which vertically supports a payload, the air chamber secured to the payload, said chamber having a depending wall;

means to introduce air into the air chamber; and a pendulum having a longitudinal axis, the pendulum having an upper end flexibly secured to the chamber wall by a diaphragm, the pendulum having a lower end flexibly suspended by pendulum wires, which wires are attached to a leg which is grounded, the pendulum wires angled with reference to the longitudinal axis of the pendulum to impart to the isolator a designed horizontal stiffness.

2. The isolator of claim 1 wherein the diaphragm comprises a rolling diaphragm to provide a multi-axis pivot point at the top of the pendulum.

3. The isolator of claim 1 wherein the pendulum wires have lower ends and which comprises:

means to adjust the radial position of the lower ends of the pendulum wires in a plane which is substantially perpendicular to the longitudinal axis of the pendulum.

4. The isolator of claim 3 wherein the means to adjust the radial position of the lower ends of the pendulum wires comprises an annular adjust plate secured to the lower end of the pendulum, the annular adjust plate comprising apertures arrayed along concentric circles and the lower ends of the pendulum wires are fastened to the apertures in one of said circles.

5. The isolator of claim 1 wherein the pendulum wires have upper ends and the upper ends of the pendulum wires are fixed to a wobble plate which is secured to the leg.

6. The isolator of claim 5 wherein the pendulum wires have lower ends and which comprises means to adjust the radial position of the lower ends of the pendulum wires in a plane which is substantially perpendicular to the longitudinal axis fo the pendulum.

7. The isolator of claim 5 which comprises:

means to adjust the wobble plate to level the isolator.

8. The isolator of claim 1 which comprises means to damp the horizontal movement of the pendulum, said means to damp secured to the pendulum to return the pendulum to a stationary condition when it been displaced horizontally.

9. The isolator of claim 1 2, 3, 4, 5 or 8 wherein the pendulum is a hollow tube.

10. The isolator of claim 1 2, 3, 4, 5 or 8 wherein the means to introduce air into the air chamber comprises:

means to flow the air through the pendulum.

11. The isolator of claim 8 wherein the means to damp comprises:

a dash pot elastically secured to the pendulum.

12. The isolator of claim 8 wherein the means to damp is secured between the pendulum and the leg.

13. A horizontal frequency vibration isolator which comprises:

an air chamber which vertically supports a payload, the air chamber secured to the payload, said chamber having a depending wall;

means to introduce air into the air chamber;

a pendulum having a longitudinal axis, an upper end flexibly secured to the chamber wall by a rolling diaphragm; and the lower end of the pendulum having an annular adjust plate secured thereto, the annular adjust plate comprising apertures arrayed along at least one concentric circle, pendulum wires secured at one end to the apertures in the annular adjust plate and secured at their other end to a wobble plate which wobble plate is secured to a leg which is grounded.

14. The isolator of claim 13 which comprises:

means to adjust the wobble plate to level the isolator wherein the wobble plate and annular plate each comprise three apertures arrayed along a concentric circle in said wobble plate and said annular plate respectively, the apertures in the wobble plate in angular registration with the apertures in the annular plate.

15. The isolator of claim 13 which comprises:

means to adjust the wobble plate to level the isolator wherein the wobble plate has apertures and the other end of the pendulum wires are secured in said apertures, the apertures in the wobble plate in angular registration with the apertures in the annular plate.

* * * * *